US010091539B1

(12) United States Patent
Kotian et al.

(10) Patent No.: US 10,091,539 B1
(45) Date of Patent: Oct. 2, 2018

(54) CUSTOMIZED OVER-THE-AIR TELEVISION CHANNEL MAPPING FOR GEOGRAPHICAL AREA USING CROWDSOURCING OF OVER-THE-AIR TELEVISION CHANNELS

(71) Applicant: Sling Media Pvt. Ltd., Bangalore (IN)

(72) Inventors: Preetham Kotian, Bangalore (IN); Jayaprakash Ramaraj, Bangalore (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 15/610,130

(22) Filed: May 31, 2017

(51) Int. Cl.
| | | |
|---|---|---|
| G06F 3/00 | (2006.01) | |
| G06F 13/00 | (2006.01) | |
| H04N 5/445 | (2011.01) | |
| H04N 21/2385 | (2011.01) | |
| H04N 21/45 | (2011.01) | |
| H04N 21/258 | (2011.01) | |
| H04N 21/61 | (2011.01) | |

(52) U.S. Cl.
CPC ... *H04N 21/2385* (2013.01); *H04N 21/25841* (2013.01); *H04N 21/4524* (2013.01); *H04N 21/6143* (2013.01)

(58) Field of Classification Search
CPC .......... H04N 21/4345; H04N 21/4383; H04N 21/4622; H04N 21/4524; H04N 21/4788; H04N 21/84; H04N 21/6112
See application file for complete search history.

(56) References Cited

U.S. PATENT DOCUMENTS 6,133,910 A * 10/2000 Stinebruner ......... H04N 5/4401
    348/731
9,326,104 B2    4/2016 Chen et al.
2003/0213001 A1*  11/2003 Yuen ................. H04N 5/44543
    725/136
2008/0311952 A1  12/2008 Sugiyama
2009/0135309 A1   5/2009 DeGeorge et al.
(Continued)

FOREIGN PATENT DOCUMENTS

CN    102970594 A    3/2013

OTHER PUBLICATIONS

TV Without Borders, "Describing TV Channels," http://www.interactivetvweb.org/tutorials/dtv_intro/atsc_psip/vct; retrieved May 12, 2017; 6 pgs.

Primary Examiner — Jason Salce
(74) Attorney, Agent, or Firm — Seed IP Law Group LLP

(57) ABSTRACT

Embodiments are directed toward providing a customized over-the-air channel mapping to each content receiver in a geographical area based on crowdsourced mappings of available channels from at least a subset of the content receivers in that geographical area. When a new content receiver is installed in the geographical area, the customized over-the-air channel mapping is provided to the new content receiver and used by the new content receiver as its internal list of available over-the-air channels without performing a scan of its own. At least a portion of the content receivers in the geographical area perform a round-robin-type scan to identify new or missing channels in the geographical area. The customized over-the-air channel mapping is then updated when a new channel or missing channel threshold is reached. And the updated customized over-the-air channel mapping is provided to each content receiver in the geographical area.

20 Claims, 7 Drawing Sheets

(56) References Cited

U.S. PATENT DOCUMENTS

| | | | |
|---|---|---|---|
| 2009/0249396 A1* | 10/2009 | Cheng | H04H 60/43 |
| | | | 725/39 |
| 2011/0096243 A1 | 4/2011 | Casagrande | |
| 2011/0131625 A1* | 6/2011 | Schlack | H04N 21/25808 |
| | | | 725/116 |
| 2014/0171097 A1 | 6/2014 | Fischer et al. | |
| 2015/0020140 A1* | 1/2015 | Takaki | H04H 60/42 |
| | | | 725/116 |
| 2015/0181282 A1* | 6/2015 | Majid | H04N 21/4384 |
| | | | 725/38 |
| 2016/0295286 A1* | 10/2016 | Kang | H04N 21/482 |
| 2017/0251243 A1* | 8/2017 | Lee | H04N 21/4384 |

* cited by examiner

CUSTOMIZED OVER-THE-AIR TELEVISION CHANNEL MAPPING FOR GEOGRAPHICAL AREA USING CROWDSOURCING OF OVER-THE-AIR TELEVISION CHANNELS

TECHNICAL FIELD

The present disclosure relates generally to audiovisual content distribution, and more particularly, but not exclusively, to crowdsourcing content receivers to identify over-the-air television channels that are available in given area.

BACKGROUND

Description of the Related Art

Content distributors deliver audiovisual content to users through a variety of different systems. These systems may include over-the-air broadcast television, satellite television, and cable television. Each of these systems has advantages and disadvantages. For example, over-the-air television is generally free, but is limited to the broadcast range of the system and the terrain between the receiving antenna and the broadcast tower. On the one hand, satellite and cable television can be accessed at great distances from the distributor, but on the other hand, they are generally rather expensive.

Some people are willing to pay monthly service fees to receive a large number of television channels from a satellite or cable television distributor. But there are other people who are unwilling to pay such fees and would prefer to receive free channels via over-the-air television. Unfortunately, hills, mountains, great distances, and other obstacles can impact which over-the-air television channels are available in a given area. Moreover, antennas may be added or removed, which can also change which over-the-air television channels are available. As a result, the viewer may be unaware of all of the over-the-air television channels that are available to that viewer. It is with respect to these and other considerations that the embodiments described herein have been made.

BRIEF SUMMARY

Briefly described, embodiments are directed toward systems and methods of providing a customized over-the-air channel mapping to each content receiver in a geographical area based on crowdsourced mappings of available channels from content receivers in that geographical area. A channel management server initially generates the customized over-the-air channel mapping by polling or receiving available over-the-air channel mappings from at least a first subset of the plurality of content receivers in the geographical area. These mappings indicate which over-the-air channels are available to each respective content receiver. The customized mapping is then provided to each new content receiver that is installed or set up in the geographical area. The new content receiver utilizes the customized over-the-air channel mapping as its own local available over-the-air channel mapping without performing a scan for available over-the-air channels. In this way, the new content receiver does not scan for available over-the-air channels. As a result, the user can begin utilizing the content receiver to receive over-the-air content much quicker upon setup.

From time to time over-the-air channels may be added or removed from the geographical area. The channel management server schedules a round-robin-type background scan by a second subset of the content receivers in the geographical area. This second subset may include the same content receivers, completely different content receivers, or some subset of same and different content receivers, as the first subset utilized to initialize the customized over-the-air channel mapping. The round-robin-type scanning utilizes a plurality of time periods or cycles in which one or more content receivers perform a scan for available over-the-air channels during that particular time period. In this way, only a portion of the content receivers are performing the scan during each round-robin time period.

The channel management server then utilizes results from each round-robin scan to determine if new channels are now available to content receivers in the geographical area or if missing channels are no longer available to content receivers in the geographical area. If a new channel is determined, then the customized over-the-air channel mapping is updated to add the new channel. If a missing channel is determined, then the customized over-the-air channel mapping is updated to remove the missing channel. The updated customized over-the-air channel mapping is then provided to each of the content receivers in the geographical area. As a result, the local over-the-air channel mappings maintained by content receivers in a geographical area can be updated without have to individually scan for changes to the available channels.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including, but not limited to, the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
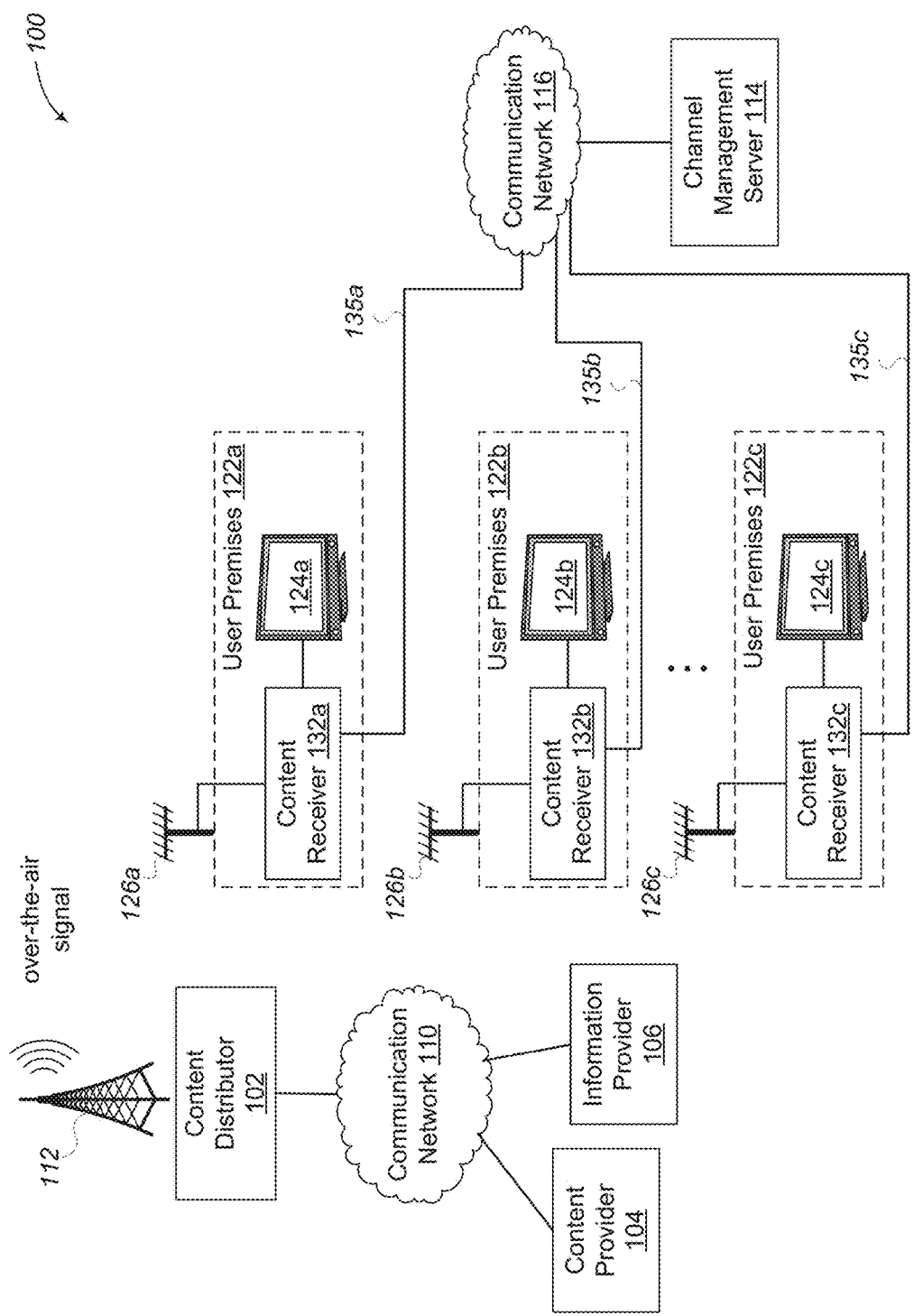
FIG. 1 illustrates a context diagram for providing audiovisual content to a user via over-the-air channels.

FIG. 1 illustrates a context diagram for providing audiovisual content to a user via over-the-air channels. Example 100 includes content provider 104, information provider 106, content distributor 102, channel management server 114, and user premises 122a-122c.

Typically, content providers 104 generate, aggregate, and/or otherwise provide audiovisual content that is provided to one or more users. Sometimes, content providers are referred to as "channels." Examples of content providers 104 may include, but are not limited to, film studios, television studios, network broadcasting companies, independent content producers, such as AMC, HBO, Showtime, or the like, or other entities that provide content for user consumption. A content provider may also include individuals that capture personal or home videos, and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports broadcasts, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the content provided by content provider 104. For example, this data may include, for example, metadata, program name, closed-caption authoring, and placement within the content, time slot data, pay-per-view and related data, or other information that is associated with the content. In some embodiments, a content distributor 102 may combine or otherwise associate the data from information provider 106 and the content from content provider 104, which may be referred to as the distributed content. However, other entities may also combine or otherwise associate the content and other data together.

Content distributor 102 provides the audiovisual content, whether content obtained from content provider 104 and/or data from information provider 106, to a user through a variety of different distribution mechanisms. For example, in various embodiments, content distributor 102 broadcasts the content through over-the-air signals via transmission tower 112.

In various embodiments, content provider 104, information provider 106, and content distributor 102 communicate with each other via communication network 110. Communication network 110 may be configured to couple various computing devices to transmit content/data from one or more devices to one or more other devices. For example, communication network 110 may be the Internet, X.25 networks, or a series of smaller or private connected networks that carry the content and other data. Communication network 110 may include one or more wired or wireless networks.

Content receivers 132a-132c are receiving devices that are on the user premises 122a-122c, respectively, and are configured to receive content from content distributor 102. Content receivers 132a-132c receive content via over-the-air signals captured by antennas 126a-126c, respectively. Content receivers 132a-132c decode the received content and provide it to display devices 124a-124c, respectively. Display devices 124a-124c may be a television, monitor, or other display device. Although FIG. 1 illustrates the content receivers 132a-132c as providing content for display on the display devices 124a-124c on the user premises 122a-122c, respectively, embodiments are not so limited. In some other embodiments, the television receivers 132a-132c provide content to a user's mobile device, such as a smartphone, tablet, or other computing device, that is at a remote location to the user premises 122a-122c. Examples of content receivers 132a-132c include, but are not limited to, a set-top box, a cable connection box, a computer, or other content or television receivers.

Content receivers 132a-132c are also configured to communicate with a channel management server 114 that is remote to the user premises 122a-122c. In various embodiments, the channel management server 114 maintains a separate customized over-the-air channel mapping for one or more different geographical areas. The channel management server 114 communicates with a plurality of content receivers 132a-132c in a given geographical area to determine which over-the-air channels are available in that geographical area. From this information, the channel management server 114 generates the customized over-the-air channel mapping and provides it to new content receiver 132 that enter that particular geographical area. The customized over-the-air channel mapping is a list of information identifying the over-the-air channels that are determined to be available In a particular geographical area. The customized over-the-air channel mapping may be for television channels (also referred to as customized over-the-air television channel mapping) or radio channels (also referred to as customized over-the-air radio channel mapping), or both. Accordingly, reference to channels or over-the-air channels includes over-the-air television channels, radio channels, or both.

In various embodiments, the content receivers 132a-132c and the channel management server 114 communicate via communication network 116. Communication network 116 may be configured to couple various computing devices via data links 135a-135c to transmit content/data from one or more content receivers 132a-132c, respectively, to one or more other devices. For example, communication network 116 may be the Internet, X.25 networks, or a series of smaller or private connected networks that carry the content and other data. Communication network 116 may include one or more wired or wireless networks using wired or wireless data links 135a-135c. In various embodiments, communication network 116 may be part of or integrated with communication network 110, or it may be a separate communication network.

Figure 2:
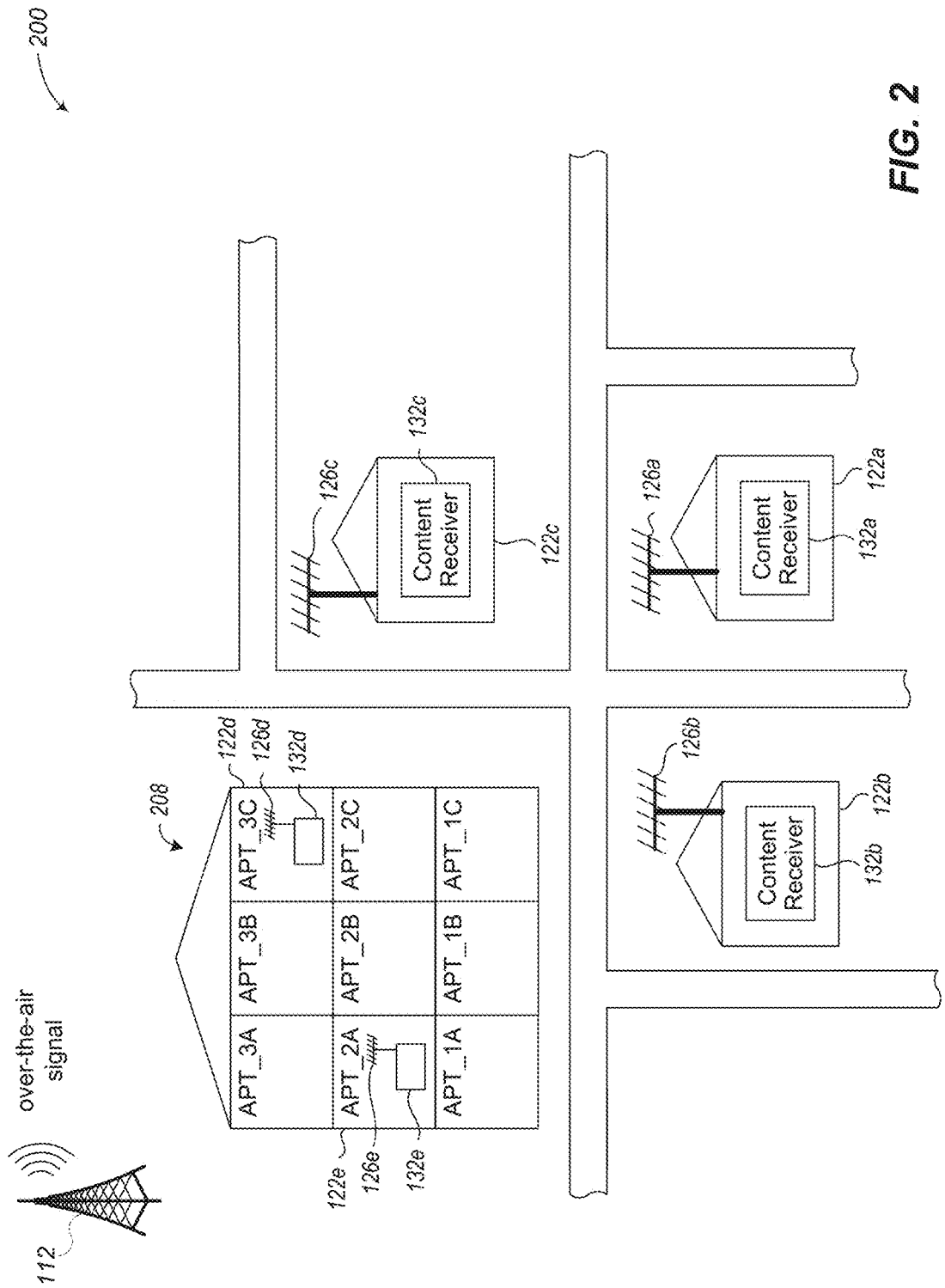
FIG. 2 is a diagram that illustrates an example of a neighborhood with multiple content receivers receiving over-the-air channels.

FIG. 2 is a diagram that illustrates an example of a neighborhood with multiple content receivers receiving over-the-air channels. In this example geographical area 200 includes a plurality of user premises 122a-122e in a neighborhood. Each user premises 122a-122e includes a respective content receiver 132a-132e and antennas 126a-126e. Content receivers 132a-132e receive radio signals for over-the-air channels from one or more broadcast towers 112 via antennas 126a-126e, respectively. In this illustrated example, user premises 122d-122e are located in apartment building 208, while user premises 122a-122c are individual user homes.

As described herein, a channel management server, not illustrated, generates a customized over-the-air channel mapping from available over-the-air channel mappings received from a plurality of content receivers. This customized over-the-air channel mapping is then provided to new content receivers.

As illustrated, content receivers 132b-132e are in the geographical area 200. All of content receivers 132b-132e or a subset therefrom provide available over-the-air channel mappings to the channel management server. In this illustration, assume that content receivers 132b-132d are selected to perform an initial background scan for over-the-air channels that are available to those television receivers, and provide the resulting available over-the-air channel mapping back to the channel management server. From these mappings, the channel management server generates a customized over-the-air channel mapping for geographical area 200.

Now assume that content receiver 132a is a new content receiver that is being newly installed and set up in geographical area 200. The channel management server sends the customized over-the-air channel mapping to content receiver 132a. Content receiver 132a then sets its local base or default mapping of available over-the-air channels to be the customized over-the-air channel mapping.

As described in more detail herein, the channel management server periodically or at predetermined times schedules and instructs one or more of content receivers 132a-132e to perform round-robin-like background scans for available over-the-air channels. In this way, the channel management server can update the customized over-the-air channel mapping to add new channels that are detected in geographical area 200 or remove channels that are no longer available in geographical area 200.

For example, content receiver 132a performs a first background scan and reports the results back to the channel management server. At some later time, e.g., the next day or the next week, content receiver 132d performs a second background scan and reports the results back to the channel management server. Following this second scan, content receiver 132c performs a third background scan and reports the results back to the channel management server. After the third scan, additional scans can be performed by other content receivers. For example, content receiver 132a can perform another scan, or some other content receiver of content receivers 132b-132e can perform the scan. It should be noted that not all content receivers 132a-132e have to or will perform the scan. Similarly, some content receivers may perform multiple scans before another content receiver performs a first scan. In any event, the channel management server schedules or instructs one or more of content receivers 132a-132e to perform background scans at predetermined times, randomly, or during specific time periods or windows, such that the channel management server obtains sampled updates on what over-the-air channels are available to the content receivers in geographical area 200.

In some other embodiments, a content receiver may perform a scan for available over-the-air channels in response to input from a user. For example, the user may utilize a remote control or application executing on a mobile phone or other computing device to manually instruct the content receiver to perform a scan for available over-the-air channels. Once this scan is complete, the content receiver updates its local over-the-air channel mapping based on any new or missing over-the-air channels, and the content receiver provides such changes in new or missing over-the-air channels to the channel management server.

If, at any point during this background scanning process, the channel management server identifies that the results from the content receivers indicate that a new channel is available in geographical area 200, then that new channel is added to the customized over-the-air channel mapping. Similarly, if the channel management server identifies that the results from the content receivers indicate that a channel is missing and no longer available in geographical area 200, then that missing channel is removed from the customized over-the-air channel mapping. The updated customized over-the-air channel mapping is then provided to each content receiver 132a-132e, even though not all content receivers performed an updating scan to find the new or missing over-the-air channels.

The operation of certain aspects will now be described with respect to FIGS. 3-6. In at least one of various embodiments, processes 300 and 400 described in conjunction with FIGS. 3 and 4, respectively, may be implemented by or executed on one or more computing devices, such as channel management server 114 in FIG. 1; and processes 500 and 600 described in conjunction with FIGS. 5 and 6, respectively, may be implemented by or executed on one or more computing devices, such as content receivers 132a-132c in FIG. 1.

Figure 3:
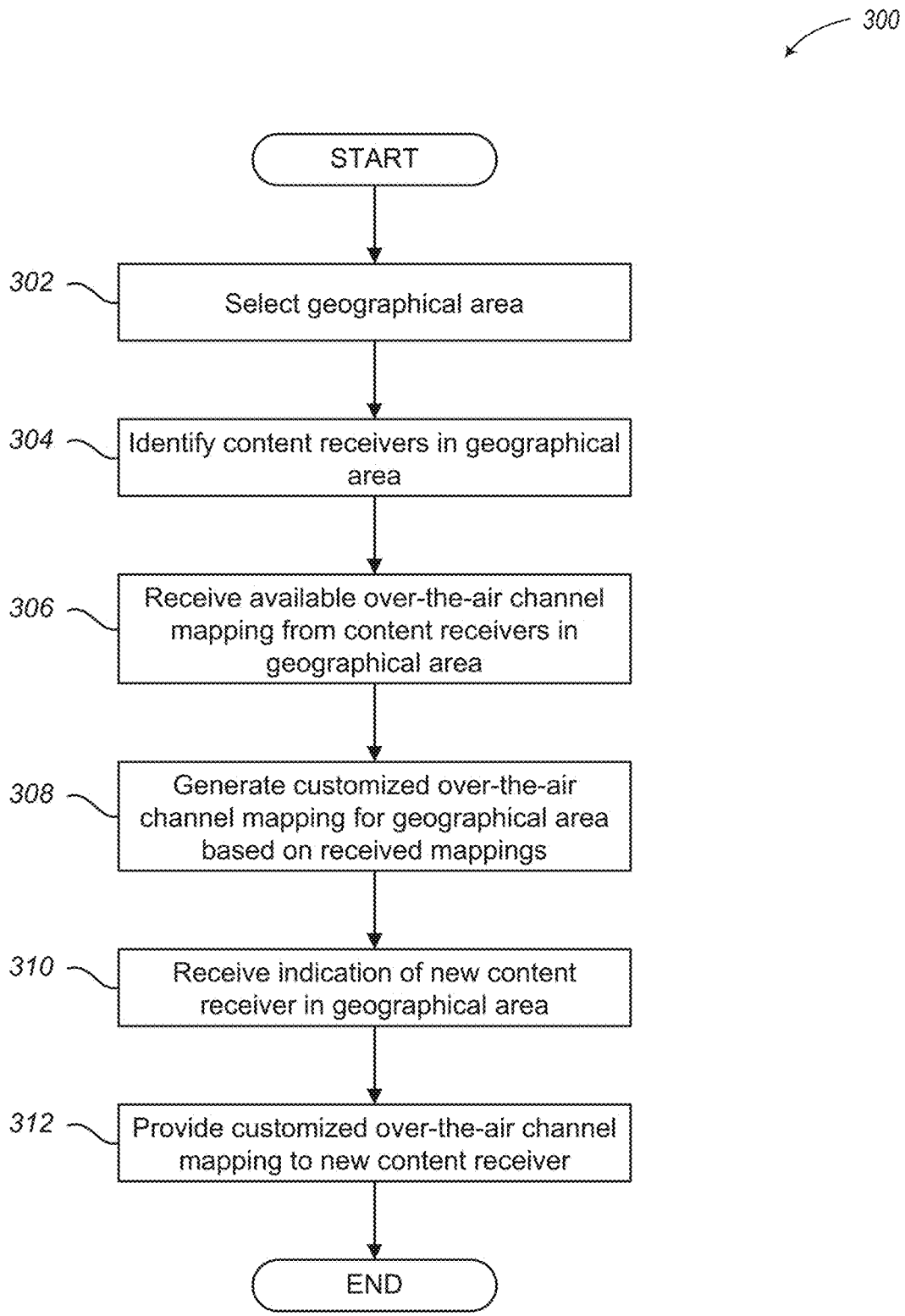
FIG. 3 illustrates a logical flow diagram generally showing one embodiment of a process performed by a channel management server for managing an over-the-air channel mapping for a geographical area based on mappings of available channels provided by content receivers in that geographical area in accordance with embodiments described herein.

FIG. 3 illustrates a logical flow diagram generally showing one embodiment of a process performed by a channel management server for managing an over-the-air channel mapping for a geographical area based on mappings of available channels provided by content receivers in that geographical area in accordance with embodiments described herein. Process 300 begins, after a start block, at block 302, where a geographical area is selected. In some embodiments, the geographical area is defined by a zip code, city limits, geographical borders (e.g., mountains), user-defined area, or other characteristics that define an area where over-the-air channels are broadcast.

Process 300 proceeds to block 304, where a plurality of content receivers are identified as being in the selected geographical area. In various embodiments, the plurality of content receivers includes all content receivers that are in communication with a channel management server. In other embodiments, the plurality of identified content receivers in the geographical area is a subset, but not all, of the content receivers in the geographical area that communicate with the channel management server. In some embodiments, the plurality of content receivers is a group of content receivers randomly selected from all content receivers in the geographical area. In other embodiments, the plurality of content receivers are identified or selected based on their location in the geographical area such that the content receivers are substantially, evenly distributed throughout the geographical area to provide a comprehensive sampling of different locations or positions within the geographical area.

Although process 300 is described as identifying a plurality of content receivers, embodiments are not so limited, and in some embodiments, only a single content receiver may be identified, such as a content receiver in a middlemost location of the geographical area.

Process 300 continues to block 306, where a mapping of available over-the-air channels is received from each of the plurality of identified content receivers in the geographical area. The available over-the-air mapping received from a content receiver is a mapping of over-the-air channels that are available to that particular content receiver. A channel is identified as being available if the radio frequency signal strength of the channel received by the content receiver is sufficiently strong to provide a visible image on a display device to a user. The mapping may include a list of channel numbers, frequencies (e.g., in VHF-low, VHF-High, UHF range), call signs, signal strength, program number, or other Advanced Television Systems Committee Over-the-Air channel properties or information regarding channels that are available to the content receiver.

Process 300 proceeds next to block 308, where a customized over-the-air channel mapping is generated or determined for the geographical area based on the received mappings. In some embodiments, the customized over-the-air channel mapping is generated from an aggregate of all unique over-the-air channels that are available to the identified content receivers in the geographical area. In other embodiments, the customized over-the-air channel mapping is generated from over-the-air channels that are available to a minimum number of content receivers. For example, an over-the-air channel is included in the customized over-the-air channel mapping if 10 or more content receivers (or some other predetermined number of content receivers) include that over-the-air channel in the available mappings received at block 306. In yet other embodiments, over-the-air channels are included in the customized over-the-air channel mapping if the signal strength received by a threshold number of content receivers in the geographical area is above a signal strength threshold.

Process 300 continues next to block 310, where an indication is received of a new content receiver in the geographical area. Such an indication may be receipt of a message from the new content receiver when it is installed or set up at a user's premises in the geographical area. In other embodiments, the new content receiver is identified when a user registers the new content receiver with the channel management server. In yet other embodiments, the new content receiver may be a content receiver that has been updated, re-formatted, or has otherwise lost or deleted its local over-the-air channel mapping.

As mentioned herein, an initial scan for available over-the-air channels can be time consuming and prevent the user for utilizing their content receiver for some time. Accordingly, when the new content receiver is installed or set up at the user's premises it does not perform an initial scan for available over-the-air channels.

Moreover, in some situations, manufactures can pre-install over-the-air channel mappings on content receivers before they are shipped to users or technicians for installation in a particular geographic area. However, these pre-installed mappings are often incomplete and inaccurate because new over-the-air channels may added or old over-the-air channels may be removed from being broadcast in the geographical area before the content receiver is installed. As a result, the user may miss some channels that are now available to the user or they may be burdened with non-existing channels. Accordingly, the new content receiver is considered not to have a pre-installed over-the-air channel mapping, regardless of whether it does or not.

Process 300 proceeds to block 312, where the customized over-the-air channel mapping is provided to the new content receiver. In various embodiments, the customized over-the-air channel mapping is included in an electronic data message or series of messages or data packets that is sent to the new content receiver. The new content receiver utilizes the customized over-the-air channel mapping to set up its own local channel mapping without performing any scan for available over-the-air channels, as described in more detail below in conjunction with FIG. 5. Since the customized over-the-air channel mapping is used as the initial or base mapping of the new content receiver, the customized over-the-air channel mapping may be referred to as a default over-the-air channel mapping for the content receivers in the geographical area. In this way, the new content receiver has a list of those over-the-air channels that are available or accessible to the new content receiver and skipping unavailable channels or frequencies.

After block 312, process 300 terminates or otherwise returns to a calling process to perform other actions.

Figure 4:
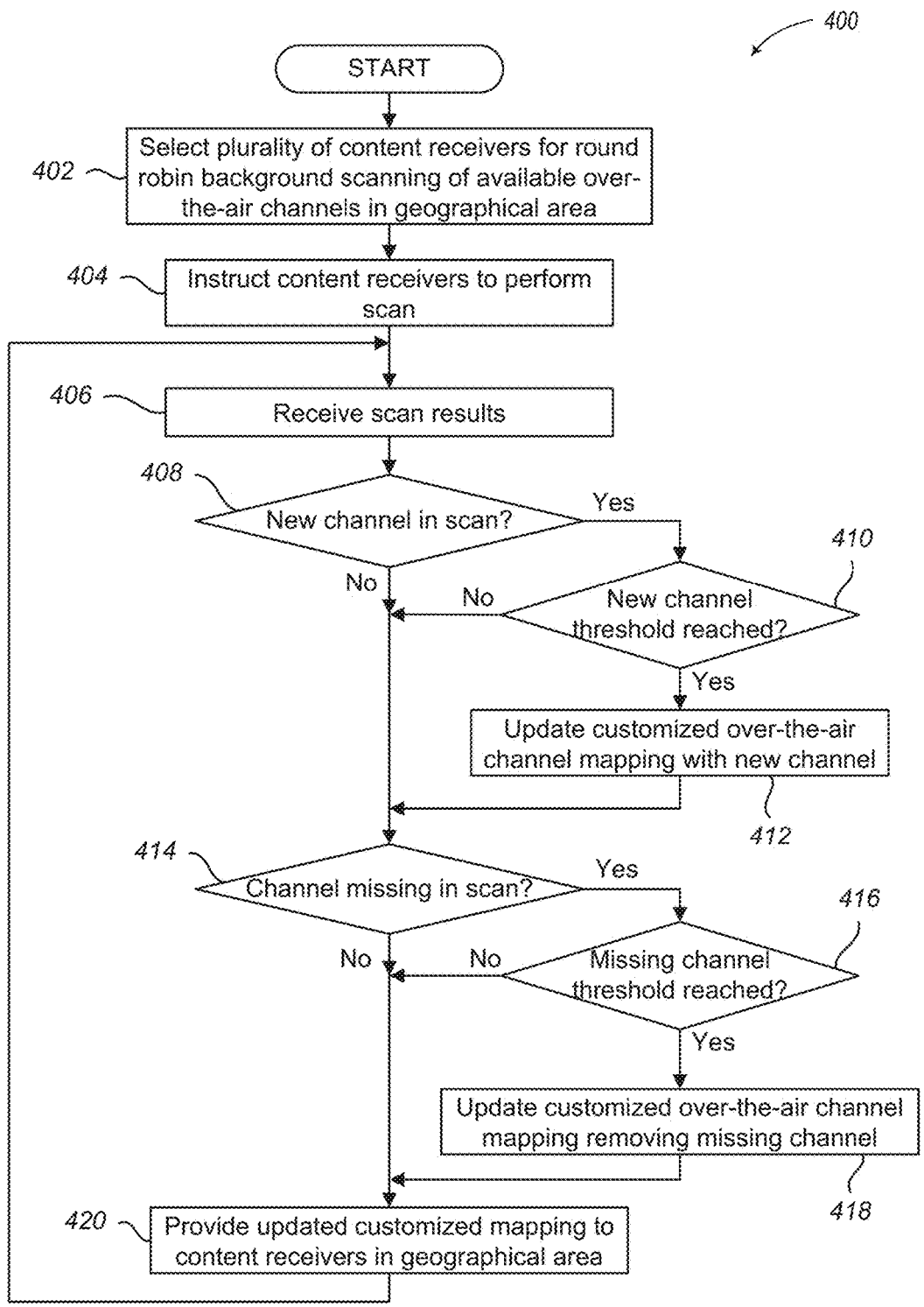
FIG. 4 illustrates a logical flow diagram generally showing one embodiment of a process performed by the channel management server for updating the over-the-air channel mapping for a geographical area in accordance with embodiments described herein.

FIG. 4 illustrates a logical flow diagram generally showing one embodiment of a process performed by the channel management server for updating the over-the-air channel mapping for a geographical area in accordance with embodiments described herein. Process 400 begins, after a start block, at block 402, where a plurality of content receivers in a geographical area are selected. These selected content receivers perform round-robin background scanning of available over-the-air channels in the geographical area. In some embodiments, these content receivers may be the same set of content receivers identified at block 304 in FIG. 3, or they may be a partial or completely different set of content receivers in the geographical area.

In various embodiments, the plurality of content receivers are selected based on their location in the geographical area such that the selected content receivers are substantially, evenly distributed throughout the geographical area to provide a comprehensive sampling of different locations within the geographical area. In some embodiments, the plurality of content receivers selected includes all content receivers in the geographical area that communicate with the channel management server. In other embodiments, the plurality of content receivers selected includes a subset, but not all, of the content receivers in the geographical area that communicate with the channel management server.

In at least one embodiment, the plurality of content receivers are selected based on their usage. In some embodiments, only those content receivers that have an idle time above a threshold amount during a predetermined period of time may be selected. For example, a content receiver with 20 minutes of idle time every day may be selected, whereas a content receiver with 5 minutes of idle time once a week may not be selected. In this way, content receivers that have time to perform background scans are selected without impacting those content receivers that are busy with other tasks.

Process 400 proceeds to block 404, where the selected content receivers are instructed to perform a scan for available over-the-air channels as part of a round-robin background scanning. The round-robin scanning includes a plurality of cycles or time windows in which one or more content receivers performs a scan for available over-the-air channels. Examples of cycles or time windows include nightly, weekly, every three days, or some other interval.

The content receivers are instructed to perform the scans such that each of the plurality of content receivers selected at block 402 take turns in performing the scan without all content receivers performing the scan at the same time or during the same cycle, time period, or timing window (e.g., on the same day or during the same week). Rather, a separate content receiver is instructed to perform the scan during each separate time period or cycle.

In some embodiments, multiple content receivers may be instructed to perform the scan during the same time period. For example, a first subset of the selected content receivers are instructed to each perform a scan during a first time period and a second subset of the selected content receivers (which may be a completely different subset than the first subset or both subsets share at least one common content receiver with at least one non-common content receiver) are instructed to each perform a scan during a second time period that is different from the first time period.

In some other embodiments, multiple content receivers may be instructed to perform a partial scan during the same time period. In at least one such embodiment, each content receiver performs a scan on a different subset of channel frequencies. In this way, the time that each content receiver is performing a scan is reduced compared to performing a scan across all channel frequencies, while collectively scanning all channel frequencies. For example, a first content receiver (or a first subset of content receivers) of the selected content receivers is instructed to perform a scan of channel frequencies associated with channels 2-15 during a specified time period; a second content receiver (or a second subset of content receivers) of the selected content receivers is instructed to perform a scan of channel frequencies associated with channels 16-30 during the specified time period; a third content receiver (or a third subset of content receivers) of the selected content receivers is instructed to perform a scan of channel frequencies associated with channels 31-45 during the specified time period; and so on. Accordingly, each channel frequency is scanned by at least one content receiver during the specified time period and that at least some of the selected content receivers are not scanning all channel frequencies. In various embodiments, the content management server selects which content receivers are to scan which subset of channel frequencies and instructs them accordingly.

Additionally, one or more selected content receivers may be instructed to perform another background scan before other selected content receivers performs their initial scan. In this way, some content receivers may perform multiple scans before other content receivers perform their first scan. Selection of which content receivers are instructed to perform additional scans may be random or it may be based on how responsive or complete the results are from the various content receivers or their location in the geographical area.

Once the content receivers have performed their scan, the content receivers can be re-instructed to perform another scan, thus creating a round-robin scan for available channels. As mentioned above, some content receivers may take additional turns scanning before other content receivers perform their initial scan or rescan. In some embodiments, after all the content receivers have performed their scan, a new plurality of content receivers may be selected at block 402, and separately perform the scan.

In various embodiments, the selected content receivers are instructed to perform their respective scans during an idle state or condition of the content receiver, such as in the middle of the night, when the user has not interacted with the content receiver for a predetermined amount of time, or the user has turned off the display device or manually put the content receiver into an idle state or condition. In other embodiments, the scan is performed as a background process that does not interfere with the user's use of the content receiver. Whether performed as a background process or as a primary process during an idle condition, the scan is referred to as a background scan because it does not impact the normal operations of the content receiver.

In some embodiments, the channel management server separately instructs each content receiver to perform a scan after it has received results from another content receiver. In other embodiments, the channel management server generates a schedule of when each selected content receiver is to perform its respective scan. The channel management server then instructs each of the selected plurality of content receivers when to perform their respective background scans, regardless of when other content receivers perform their scans. For example, the channel management server may schedule content_receiver_A to perform its scan on Monday night, content_receiver_B to perform its scan on Tuesday night, and so on. The channel management server can then instruct each of these content receivers when to perform their scan before it even receives results from the first scan. In this way, each content receiver is performing its scan independent of other content receivers and not stuck waiting if a content receiver is unavailable or not responding. In other embodiments, each content receiver waits until a previous content receiver has completed its scan and provided its results back to the channel management server before performing its own scan. In at least one such embodiment, notification of a previously performed scan can be received from the channel management server after it receives the results of the previous scan or from the content receiver that performed the previous scan.

Process 400 continues at block 406, where scan results are received from the next content receiver. In various embodiments, the scan results include a complete mapping of over-the-air channels that are available to that content receiver. In other embodiments, the scan results include differences between the customized over-the-air channel mapping and the channels found during the scan as being new available channels or missing channels to the content receiver. As described elsewhere herein, an available channel is one where a content receiver received a signal strength for the channel that is above a threshold value, which is sufficiently strong to display a reasonably clear image on a display device to the user of the content receiver.

Process 400 proceeds next to decision block 408, where a determination is made whether a new channel was found during the scan. New channels may be found due to a new broadcast antenna being installed, a new channel being broadcast in the geographical area, or removal or change in the landscape causing the signal strength of previously unavailable channels to improve. A new channel is found if it is listed as available in the results from the content receiver and is not previously listed in the customized over-the-air channel mapping. If a new channel is found in the scan, process 400 flows to decision block 410; otherwise, process 400 flows to decision block 414.

At decision block 410, a determination is made whether a new channel threshold is reached for each new channel found in the scan. In some embodiments, the new channel threshold is reached once a threshold number of content receivers (e.g., 10 or more) have identified a new channel in a scan. In other embodiments, the new channel threshold is reached if the signal strength received by a threshold number of content receivers in the geographical area is above a signal strength threshold. In yet other embodiments, the new channel threshold is reached if a new channel has been found in a threshold number of scans over a predetermined amount of time (e.g., over a two-week span). In some embodiments, the new channel threshold may be a combination of different thresholds, such as those listed above. If the new channel threshold has been reached for one or more new channels, process 400 flows to block 412; otherwise, process 400 flows to decision block 414.

At block 412, the customized over-the-air channel mapping is updated to include each new channel that satisfied the new channel threshold. In various embodiments, the details or information included in the mapping for the new channel may be received from the content receiver or obtained from a third party or database of over-the-air channels. It should be recognized that one or a plurality of new channels may be identified as a new channel or may be added to the customized over-the-air channel mapping at a given time depending on various factors (including, but not limited to, weather conditions, number of new broadcast towers, locations of new broadcast towers, changes in the channels being broadcast, etc.) that can impact whether an over-the-air channel is available at a content receiver.

If no new channels are found in the scan at decision block 408 or if the new channel threshold is not reached at decision block 410 or if new channels have been added to the customized over-the-air channel mapping at block 410, process 400 proceeds to decision block 414. At decision block 414, a determination is made whether one or more channels in the customized over-the-air channel mapping are missing from the scan. A channel is missing if it is not found during the scan but was previously listed in the customized over-the-air channel mapping. If a channel is missing from the scan, process 400 flows to decision block 416; otherwise, process 400 flows to block 420.

At decision block 416, a determination is made whether a missing channel threshold is reached for each missing channel not found in the scan. In some embodiments, the missing channel threshold is reached once a threshold number of content receivers (e.g., 10 or more) have indicated that the channel was not found in a scan. In other embodiments, the missing channel threshold is reached if the signal strength received by a threshold number of content receivers in the geographical area is below a signal strength threshold. In yet other embodiments, the missing threshold is reached if the channel has not been found in a threshold number of content receivers over a predetermined amount of time (e.g., over a two-week span). In some embodiments, the missing channel threshold may be a combination of different thresholds, such as those listed above. If the missing channel threshold has been reached for one or more missing channels, process 400 flows to block 418; otherwise, process 400 flows to block 420.

At block 418, the customized over-the-air channel mapping is updated to remove each missing channel that satisfied the missing channel threshold. It should be recognized that one or a plurality of channels may be identified as a missing channel or may be removed from the customized over-the-air channel mapping at a given time.

If no missing channels are found in the scan at decision block 414 or if the new channel threshold is not reached at decision block 416 or if missing channels have been removed from the customized over-the-air channel mapping at block 418, process 400 proceeds to block 420. At block 420, the updated customized over-the-air channel mapping is provided to each content receiver in the geographical area that communicates with the channel management server. Since the plurality of content receivers selected at block 402 may be a subset of all the content receivers in the geographical area that communicate with the channel management server, the over-the-air channel mapping of each content receiver in the geographical area can be updated based on scans by only a small number of content receivers in the geographical area.

In various embodiments, the updated customized over-the-air channel mapping is pushed to each content receiver at a predetermined time or in response to an update. In at least one embodiment, the channel management server and content receivers coordinate when the updated customized over-the-air channel mapping is to be provided to the content receiver, such as during an idle state of the content receiver, or during a scheduled update of the content receiver. If the customized over-the-air channel mapping is not updated at block 412 or block 418, then the channel management server may not perform additional actions at block 420, or it may notify each content receiver that there are no updates to the customized over-the-air channel mapping.

After block 420, process 400 loops to block 406 to receive additional scan results. As mentioned above, one or more of the plurality of content receivers take turns in performing scans in a round-robin format to ensure that scan results are obtained from content receivers in different locations throughout the geographical area to identify new or missing channels in the customized over-the-air channel mapping.

In various embodiments, the channel management server performs additional tasks, such as maintaining various statistical information about the content receivers in the geographical area. For example, such information may include a count of the number of content receivers that identified or discovered each over-the-air channel in the geographical area, signal strength (min, max, average) of each channel frequency identified as being available in the geographical area, count of the number of over-the-air channels identified (min, max, average) as being available to each content receiver, etc. This information can be provided to or utilized by broadcasters to determine how to improve coverage of available channels in the geographical area (e.g., adding additional towers, boosting signal strength, etc.).

Figure 5:
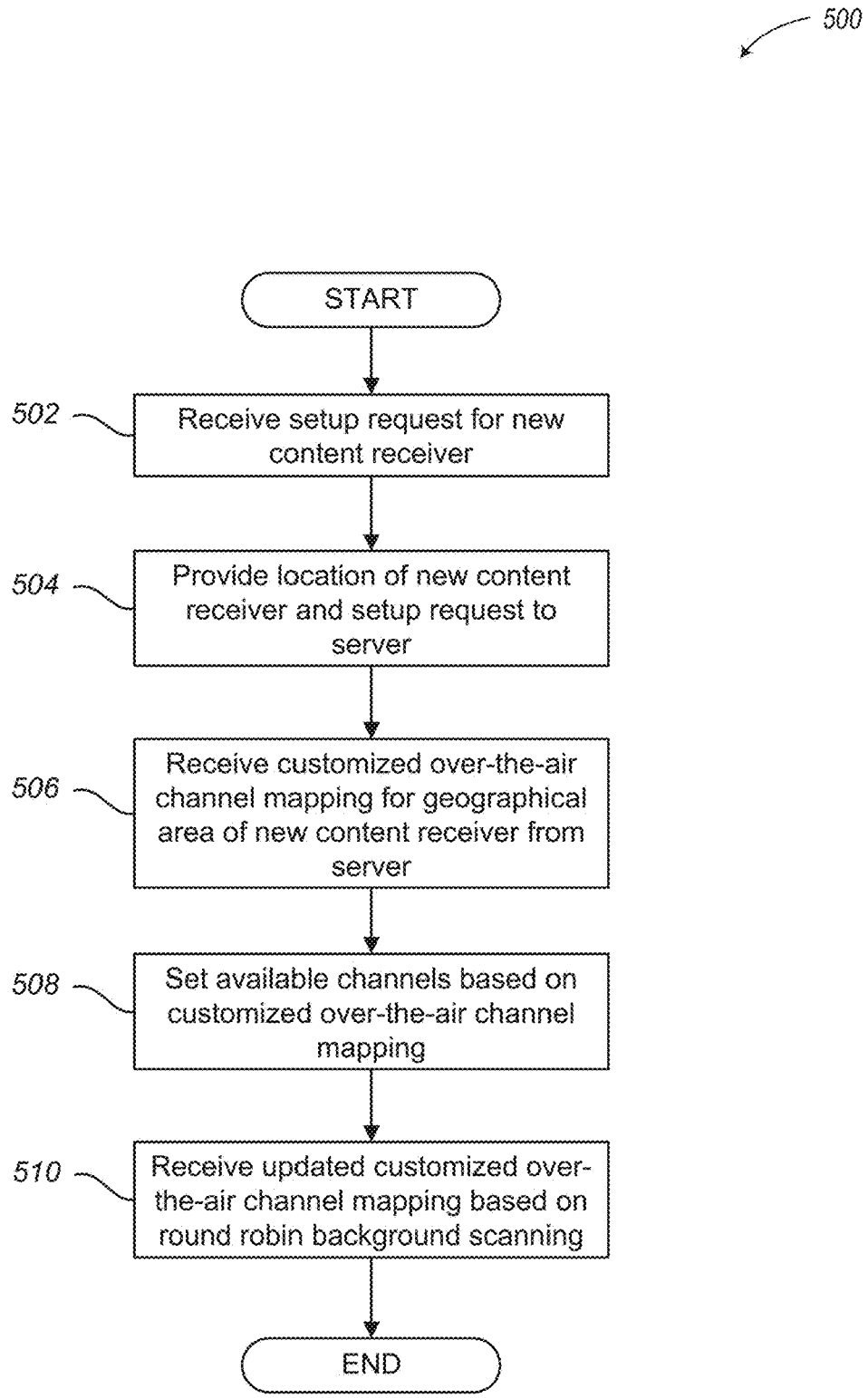
FIG. 5 illustrates a logical flow diagram generally showing one embodiment of a process performed by a content receiver to obtain an over-the-air television channel mapping in accordance with embodiments described herein.

FIG. 5 illustrates a logical flow diagram generally showing one embodiment of a process performed by a content receiver to obtain an over-the-air channel mapping in accordance with embodiments described herein. Process 500 begins, after a start block, at block 502, where a setup request is received for a new content receiver. In some embodiments, this setup request is input from a user via a graphical or physical user interface provided by the new content receiver. Such input may be provided by the user after the user has installed the new content receiver and turned it on, or as part of the user connecting the new content receiver to the internet.

Process 500 proceeds to block 504, where a location of the new content receiver and the setup request is provided to the channel management server. In various embodiments, the location may be input by the user or determined by the content receiver. For example, the location may be the mailing or billing address of the user of the new content receiver, a GPS location of the content receiver, or other location information.

Process 500 continues at block 506, where a customized over-the-air channel mapping is received for a geographical area associated with the new content receiver. As indicated above in conjunction with FIG. 3, the channel management server utilizes other content receivers in the same geographical area of the new content receiver to generate a customized over-the-air channel mapping for that geographical area.

Process 500 proceeds next to block 508, where the new content receiver sets its local mapping of available channels based on the customized over-the-air channel mapping. This setup of available channels takes place instead of a scan for available channels, at least during the initial setup of the new content receiver. Accordingly, the new content receiver does not search each possible channel radio frequency for signals that have a signal strength above a threshold value to indicate an available channel. Since the content receiver does not search for available channels during the setup of the new content receiver but relies on the customized over-the-air channel mapping, the new content receiver does not have to wait to finish a scan to finish, and can finalize the setup much quicker and enable the user to begin using the new content receiver.

Additional scans may be performed at the request of the user or in conjunction with round-robin scanning to update the customized over-the-air channel mapping, as discussed in more detail below in conjunction with FIG. 6. Since the received customized over-the-air channel mapping is utilized instead of a scan, the content receiver can begin to receive television signals output corresponding to channel programming content to the user quicker than if the user had to wait for the content receiver to perform a scan.

Moreover, the setup of the local mapping of available channels based on the customized over-the-air channel mapping is performed independent of any pre-installed mappings on the new content receiver. Thus, the new content receiver does not include any pre-installed mappings or it ignores any pre-installed mappings that are stored on the new content receiver. In this way, the content receiver manufacture does not have to customize new content receivers in anticipation of the geographical area in which it will be installed, nor does the new content receiver have to rely on any such pre-installed mappings—especially since such pre-installed mapping may be for a different geographical area or it may be incomplete or inaccurate.

After block 510, process 500 continues at block 510, where an updated customized over-the-air channel mapping based on round-robin background scanning, as described herein, is received. In various embodiments, the content receiver resets its local list or mapping of available over-the-air channels to be the updated customized over-the-air channel mapping.

Since the user can add or remove channels from the content receiver's local available channel mapping—by performing additional scans or manually adding or removing channels—the local available over-the-air channel mapping may be different from the previous, or non-updated, customized over-the-air channel mapping. Accordingly, it may be undesirable to the user for the content receiver to reset the content receiver's local over-the-air channel mapping to be the updated customized over-the-air channel mapping, and ignore the previous changes that were made to the content receiver's local over-the-air channel mapping. Thus, in some embodiments, the content receiver updates its local available over-the-air channel mapping based on the updated customized over-the-air channel mapping without overwriting it completely.

For example, if the updated customized over-the-air channel mapping includes a new channel that is not in the content receiver's local available over-the-air channel mapping, then the content receiver adds the new channel to the local available over-the-air channel mapping. Similarly, if the content receiver's local available over-the-air channel mapping includes a channel that is missing in the updated customized over-the-air channel mapping, then the content receiver removes the missing channel from its local available over-the-air channel mapping.

In yet other embodiments, the user may be prompted to select or approve each change or difference between the updated customized over-the-air channel mapping and the local available over-the-air channel mapping. In various embodiments, the content receiver may store user preferences that indicate how the updated customized over-the-air channel mapping is used to update the local available over-the-air channel mapping.

After block 508, process 500 terminates or otherwise returns to a calling process to perform other actions.

Figure 6:
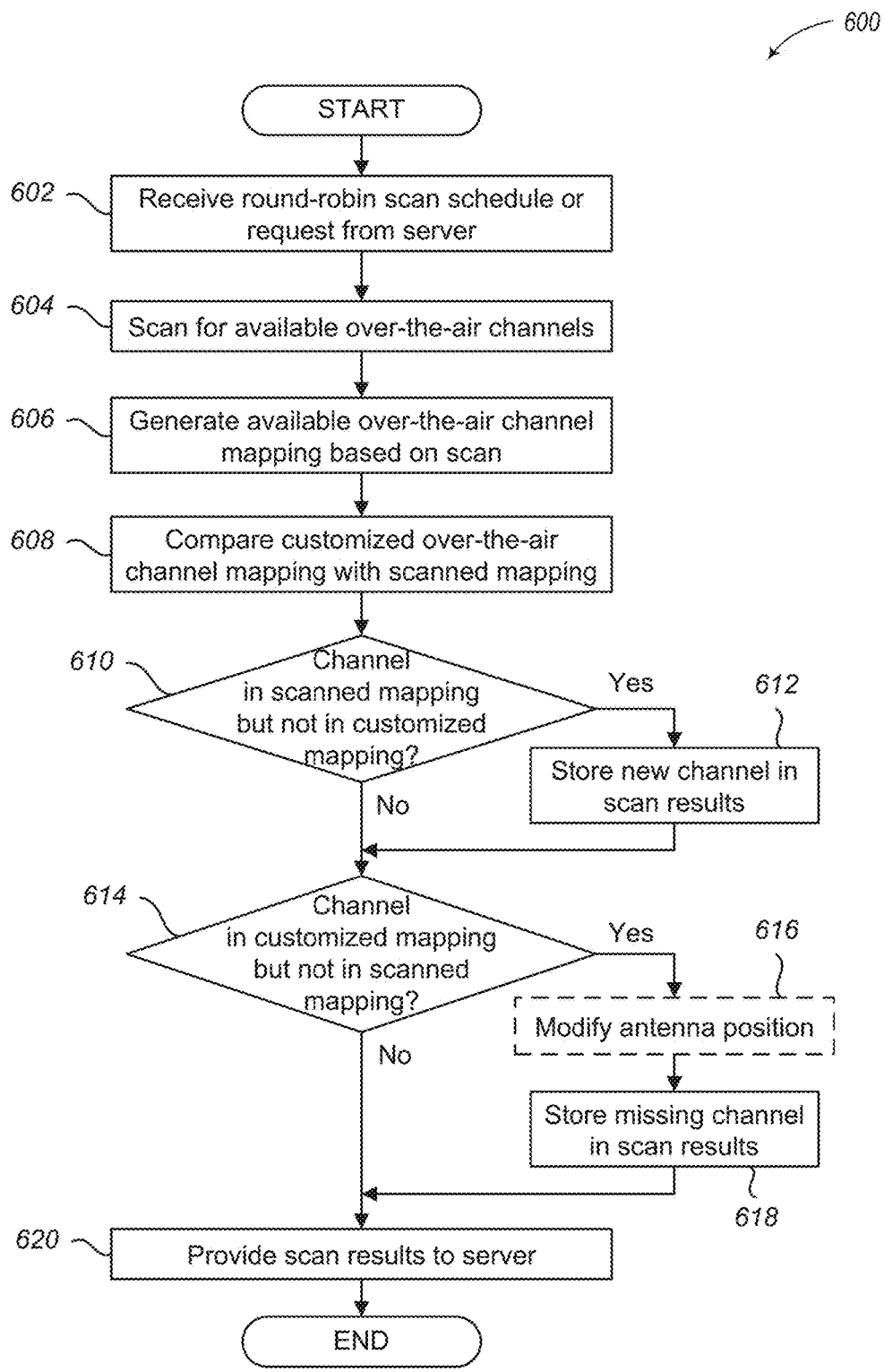
FIG. 6 illustrates a logical flow diagram generally showing one embodiment of a process performed by the content receiver to scan for changes in over-the-air channels that are available to that content receiver in accordance with embodiments described herein.

FIG. 6 illustrates a logical flow diagram generally showing one embodiment of a process performed by the content receiver to scan for changes in over-the-air channels that are available to that content receiver in accordance with embodiments described herein. Process 600 begins, after a start block, at block 602, where a round-robin scan schedule or request is received from the channel management server. As indicated above, the channel management server may individually instruct which content receivers are to perform scans at particular times, or it may provide a schedule on when that particular content receiver is to perform a scan.

Process 600 proceeds to block 604, where the content receiver scans for available over-the-air channels. In various embodiments, the scan includes utilizing tuner and demodulator hardware circuits to cycle through each radio frequency in the over-the-air channel band to identify those frequencies with a signal strength above a predetermined threshold or where the content receiver receives some identifying information from the over-the-air channel. In some embodiments, multiple tuner and demodulator circuits may be utilized to perform the scan at multiple frequencies simultaneously Process 600 continues at block 606, where an available over-the-air channel mapping is generated based on the scan. In various embodiments, this mapping includes a list of channel numbers, frequencies (e.g., in VHF-low, VHF-High, UHF range), call signs, signal strength, program number, or other Advanced Television Systems Committee Over-the-Air channel properties or information regarding channels that are available to the content receiver. In various embodiments, the available over-the-air channel mapping is generated in parallel with the scan, such that when the scan identifies an available channel, that channel is added to the available over-the-air channel mapping for that content receiver.

Process 600 proceeds next to block 608, where the customized over-the-air channel mapping is compared with the scanned mapping. In some embodiments, this comparison may be performed after the scan is complete. In other embodiments, this comparison may be performed in conjunction and parallel with the scan such that the comparison is performed at each frequency for available channels identified in the customized over-the-air channel mapping, or at each frequency identified by the scan as being an available channel.

Process 600 continues next at decision block 610, where a determination is made whether one or more channels are found in the scanned mapping but not in the customized over-the-air channel mapping based on the comparison of the mappings. If a channel is in the scanned mapping but not in the customized over-the-air channel mapping, then a new available channel has been found during the scan, and process 600 flows to block 612; otherwise process 600 flows to decision block 614.

At block 612, each channel that is in the scanned mapping but not in the customized over-the-air channel mapping is identified and stored as a new channel in a scan result to be provided to channel management server. After block 612, process 600 flows to decision block 614.

If, at decision block 610, no new channels are found in the scanned mapping, process 600 flows from decision block 610 to decision block 614. At decision block 614, a determination is made whether one or more channels in the customized over-the-air channel mapping are missing in the scanned mapping based on the comparison of the mappings. If a channel is missing in the scanned mapping, process 600 flows to block 616; otherwise, process 600 flows to block 620.

At block 616, the antenna of the content receiver is modified. In some embodiments, the content receiver outputs a message, such as via a display device or an audible message, instructing the user of the content receiver to try to adjust the antenna connected to the content receiver. In some situations the missing channel may not have been found by the content receiver because the antenna is misaligned or not positioned correctly to receive the over-the-air radio signals. In at least one embodiment, the instruction may provide a direction in which to move the antenna. In other embodiments, the content receiver may output a signal to a motor that controls a position of the antenna to correct the alignment of the antenna to try to receive the radio signals for the missing channel.

The direction to move the antenna or to instruct the user to move the antenna may be determined based on a known location of the broadcast tower associated with the missing channel or it may be inferred from the signal strength associated with the missing channel received by other content receivers in the geographical area (e.g., a direction of the content receiver with the highest signal strength for the missing channel relative to the location of the content receiver that is missing the channel).

In various embodiments, block 616 is optional and is not performed.

Process 600 then continues at block 618, where each channel that is in the customized over-the-air channel mapping but not in the scanned mapping is identified and stored as a missing channel in the scan result to be provided to channel management server. After block 618, process 600 flows to block 620.

If, at decision block 614, no missing channels are found in the scanned mapping, process 600 flows from decision block 614 to block 620. At block 620, the scan results of the new or missing channels is provided to the channel management server. In various embodiments, the content receiver provides the channel number, frequency, call sign, signal strength, or other information or identifier of the new channel(s) that are available to the content receiver or the missing channel(s) that are unavailable to the content receiver.

After block 620, process 600 terminates or returns to a calling process to perform other actions.

Although process 600 describes comparing the scanned mapping with the customized over-the-air channel mapping, embodiments are not so limited. In other embodiments, the content receiver provides the scanned mapping to the channel management server as the scan results, and the channel management server performs the comparison between the scanned mapping of multiple content receivers with the customized over-the-air channel mapping.

Figure 7:
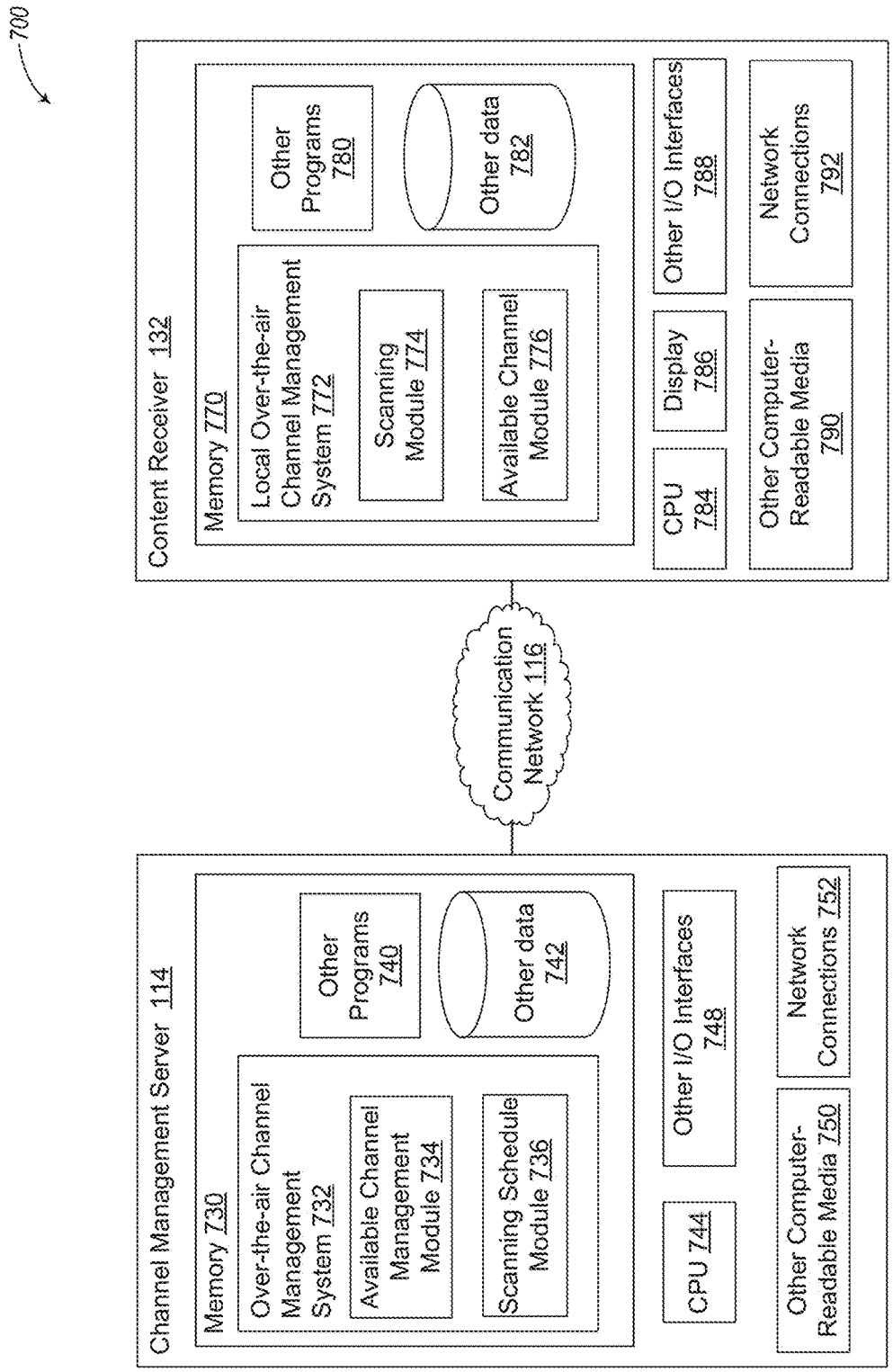
FIG. 7 shows a system diagram that describes one implementation of computing systems for implementing embodiments described herein.

FIG. 7 shows a system diagram that describes one implementation of computing systems for implementing embodiments described herein. System 700 includes content receiver 132 and channel management server 114. For ease of illustration, only one content receiver 132 is shown in FIG. 7, but as described elsewhere herein, the channel management server 114 communicates with a plurality of content receivers 132a-132c.

Channel management server 114 communicates with a plurality of content receivers 132 to determine a customized over-the-air channel mapping for a geographical area and to update the customized over-the-air channel mapping using a round-robin scanning procedure, as discussed herein.

One or more general-purpose or special-purpose computing systems may be used to implement channel management server 114. Accordingly, various embodiments described herein may be implemented in software, hardware, firmware, or in some combination thereof.

Channel management server 114 includes memory 730, one or more central processing units (CPUs) 744, other I/O interfaces 748, other computer-readable media 750, and network connections 752.

Memory 730 includes one or more various types of non-volatile and/or volatile storage technologies. Examples of memory 730 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 730 may be utilized to store information, including computer-readable instructions that are utilized by CPU 744 to perform actions, including embodiments described herein as being performed by the channel management server.

Memory 730 may have stored thereon over-the-air channel management system 732, which includes available channel management module 734 and scanning schedule module 736. The available channel management module 734 employs embodiments described herein to communicate with a plurality of content receivers in a geographical area to obtain information associated with the over-the-air channels available to those content receivers and to generate a customized over-the-air channel mapping based on that obtained information. Scanning schedule module 736 employs embodiments described herein to coordinate the periodic scanning by select content receivers to update the customized over-the-air channel mapping. In various embodiments, the scanning schedule module 736 works with the available channel management module 734 to update the customized over-the-air channel based on information received from content receivers during their scheduled scans.

Memory 730 may also store other programs 740 and other data 742. For example, other data 742 may include a separate customized over-the-air channel mapping for each of a plurality of different geographical areas, lists or information regarding the content receivers in those geographical areas, or other information.

Network connections 752 are configured to communicate with other computing devices, such as content receiver 132 via communication network 116. Other I/O interfaces 748 may include a keyboard, audio interfaces, other video interfaces, or the like. Other computer-readable media 750 may include other types of stationary or removable computer-readable media, such as removable flash drives, external hard drives, or the like.

Content receiver 132 receives content from a content distributor, such as content distributor 102 in FIG. 1, which is not shown for ease of illustration. During setup, the content receiver 132 utilizes the customized over-the-air channel mapping to set up its own list of available channels without ever performing a scan for channels, as described herein. The content receiver 132 participates in a round-robin scanning procedure to periodically scan for available channels and to provide new or missing channels to the channel management server 114, as described herein.

One or more general-purpose or special-purpose computing systems may be used to implement content receiver 132. Accordingly, various embodiments described herein may be implemented in software, hardware, firmware, or in some combination thereof.

Content receiver 132 includes memory 770, one or more central processing units (CPUs) 784, display interface 786, other I/O interfaces 788, other computer-readable media 790, and network connections 792.

Memory 770 may include one or more various types of non-volatile and/or volatile storage technologies. Examples of memory 770 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 770 may be utilized to store information, including computer-readable instructions that are utilized by CPU 784 to perform actions, including embodiments described herein as being performed by the content receiver.

Memory 770 may have stored thereon local over-the-air channel management system 772, which includes scanning module 774 and available channel module 776. The scanning module 774 employs embodiments described herein to perform scans to identify new or missing channels compared to the customized over-the-air channel mapping. Available channel module 776 employs embodiments described herein to set its own local over-the-air channel mapping based on the customized over-the-air channel mapping provided by the channel management server 114. In some embodiments, a user can provide input to adjust the local over-the-air channel mapping, such as if the user does not want to see a particular channel as being available.

Memory 770 may also store other programs 780 and other data 782. For example, other data 782 may include the customized over-the-air channel mapping, a local over-the-air television mapping, or other information.

Display interface 786 is configured to provide content to a display device, such as display device 124. Network connections 792 are configured to communicate with other computing devices, such as channel management server 114 via communication network 110. Other I/O interfaces 788 may include a keyboard, audio interfaces, other video interfaces, or the like. Other computer-readable media 790 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a computing device, comprising:
   selecting a geographical area that includes a plurality of content receivers;
   selecting a first subset of the plurality of content receivers;
   receiving, from each respective content receiver of the first subset of content receivers, a mapping of over-the-air television channels that are available to the respective content receiver;
   generating a customized over-the-air channel mapping for the selected geographical area based on the mappings received from the subset of content receivers;
   receiving an indication of a new content receiver in the selected geographical area;
   providing the customized over-the-air channel mapping to the new content receiver to set which over-the-air channels are available to the new content receiver without the new content receiver scanning for available over-the-air channels;
   for a second subset of the plurality of content receivers:
     selecting a first content receiver from the second subset of content receivers;
     instructing the first content receiver to perform a first scan during a first time period for over-the-air channels that are available to the first content receiver;
     selecting a next content receiver from the second subset of content receivers;
     instructing the next content receiver to perform a next scan during a next time period for over-the-air channels that are available to the next content receiver;
     repeating the steps of selecting a next content receiver and instructing the next content receiver to perform a next scan during a next time period for all content receivers in the second subset of the plurality of content receivers, wherein the first time period and the next time period are non-overlapping time windows; and
     receiving, from each content receiver in the second subset of content receivers, a scan result identifying at least one of a new channel that is not in the customized over-the-air channel mapping but available to the selected content receiver or a missing channel that is in the customized over-the-air channel mapping but is unavailable to the selected content receiver;
   updating the customized over-the-air channel mapping to add the new channel to the customized over-the-air channel mapping or remove the missing channel from the customized over-the-air channel mapping based on the scan results received from each content receiver selected from the second subset of content receivers; and providing the updated customized over-the-air channel mapping to each of the plurality of content receivers in the selected geographical area.

2. The method of claim 1, wherein the second subset of content receivers has at least one content receiver that is not in the first subset of content receivers.

3. The method of claim 1, wherein the second subset of content receivers includes at least two content receivers of the plurality of content receivers and does not include all content receivers of the plurality of content receivers.

4. The method of claim 1, wherein repeating the steps of selecting a next content receiver and instructing the next content receiver to perform a next scan during a next time period includes:

selecting a second content receiver from the second subset of content receivers;

instructing the second content receiver to perform a second scan during a second time period for over-the-air channels that are available to the second content receiver, the second time period being after the first time period in which the first content receiver performs the first scan;

selecting a third content receiver from the second subset of content receivers; and instructing the third content receiver to perform a third scan during a third time period for over-the-air channels that are available to the third content receiver, the third time period being after the second time period in which the second content receiver performs the second scan.

5. The method of claim 4, wherein the second content receiver is a different content receiver from the first content receiver and the third content receiver is a different content receiver from the second content receiver.

6. The method of claim 1, wherein selecting a next content receiver from the second subset of content receivers includes:

randomly selecting the next content receiver from the second subset of content receivers independent of which content receiver was previously selected.

7. The method of claim 1, wherein selecting a next content receiver from the second subset of content receivers includes:

selecting the next content receiver from the second subset of content receivers such that each content receiver of the second subset of content receivers is sequentially selected.

8. The method of claim 1, wherein updating the customized over-the-air channel mapping includes:

determining if a new channel threshold is reached based on the scan results received from each content receiver selected from the second subset of content receivers; and in response to a determination that the new channel threshold is reached, adding the new channel to the customized over-the-air channel mapping.

9. The method of claim 1, wherein updating the customized over-the-air channel mapping includes:

determining a number of content receivers that identified the new channel; and adding the new channel to the customized over-the-air channel mapping in response to the determined number of content receivers being above a threshold amount.

10. The method of claim 1, wherein updating the customized over-the-air channel mapping includes:

determining a number of content receivers that identified the new channel as having a strength of signal above a threshold value; and adding the new channel to the customized over-the-air channel mapping in response to the determined number of content receivers being above a threshold amount.

11. The method of claim 1, wherein updating the customized over-the-air channel mapping includes:

determining if a missing channel threshold is reached based on the results received from each content receiver selected from the second subset of content receivers; and in response to a determination that the missing channel threshold is reached, removing the missing channel from the customized over-the-air channel mapping.

12. The method of claim 1, wherein updating the customized over-the-air channel mapping includes:

determining a number of content receivers that identified the missing channel; and removing the missing channel from the customized over-the-air channel mapping in response to the determined number of content receivers being above a threshold amount.

13. The method of claim 1, further comprising:

in response to receiving, from the first content receiver, a first result indicating a missing channel that is in the customized over-the-air channel mapping but is unavailable to the first content receiver:

determining which of the second subset of content receivers are proximal to the first content receiver; and selecting the next content receiver from those content receivers that are determined to be proximal to the first content receiver; and in response to a second result received from the next content receiver identifying the missing channel, removing the missing channel from the customized over-the-air channel mapping.

14. The method of claim 1, further comprising:

receiving, from the first content receiver, a first result of the first scan that identifies the missing channel; and instructing the first content receiver to display a message to a user of the first content receiver to move an antenna utilized by the first content receiver.

15. The method of claim 1, further comprising:

receiving, from the first content receiver, a first result of the first scan that identifies the missing channel; and instructing the first content receiver to send a control signal to a motor that changes a position or orientation of an antenna utilized by the first content receiver.

16. A device, comprising:

a memory that stores instructions and a customized over-the-air channel mapping that identifies a plurality of over-the-air channels that are available in a geographical area; and a processor that executes the instructions to perform actions, including:

generating the customized over-the-air channel mapping for the geographical area based on a plurality of available over-the-air channel mappings received from a first subset of a plurality of content receivers in the geographical area;

receiving an indication of a new content receiver in the geographical area;

providing the customized over-the-air channel mapping to the new content receiver to use as an initial list of over-the-air channels that are available to the new content receiver without the new content receiver scanning for available over-the-air channels;

including the new content receiver in the plurality of content receivers;

selecting a second subset of the plurality of content receivers;

determining a schedule for each respective content receiver of the second subset of content receivers to independently perform a background scan for over-the-air channels that are available to that respective content receiver during non-overlapping time windows;

providing the schedule to each respective content receiver of the second subset of content receivers;

receiving, from each respective content receiver of the second subset of content receivers, a scan result identifying channels that are available to that respective content receiver;

updating the customized over-the-air channel mapping based on a comparison between the scan results and the customized over-the-air channel mapping;

providing the updated customized over-the-air channel mapping to each of the plurality of content receivers in the geographical area.

17. The device of claim 16, wherein updating the customized over-the-air channel mapping further comprises:
comparing the scan results to the customized over-the-air channel mapping to identify a new channel that is available in the geographical area based on the new channel being available to a first threshold number of the second subset of content receivers but is not in the customized over-the-air channel mapping; and
adding the identified new channel to the customized over-the-air channel mapping.

18. The device of claim 16, wherein updating the customized over-the-air channel mapping further comprises:
comparing the scan results to the customized over-the-air channel mapping to identify a missing channel that is now unavailable in the geographical area based on the missing channel being in the customized over-the-air channel mapping but unavailable to a second threshold number of the second subset of content receivers; and
remove the identified missing channel from the customized over-the-air channel mapping.

19. The device of claim 16, wherein providing the schedule to each respective content receiver of the second subset of content receivers includes:
instructing each of the second subset of content receivers to perform a scan for available over-the-air channels during separate time periods.

20. A system, comprising:
a plurality of content receivers in a geographical area, the plurality of content receivers includes:
a first subset of content receivers that each have stored a local mapping of available over-the-air channels; and
a second subset of content receivers that are new to the geographical area, each content receiver of the second subset of content receivers does not have an initially stored local mapping of available over-the-air channels; and
a channel management server that includes a processor that executes instructions to:
generate a customized over-the-air channel mapping for the geographical area based on a plurality of available over-the-air channel mappings received from the first subset of content receivers;
provide the customized over-the-air channel mapping to each content receiver of the second subset of content receivers to store as the local mapping of available over-the-air channels;
instruct each respective content receiver of the first subset of content receivers to perform a scan for over-the-air channels that are available to that respective content receiver during non-overlapping time windows;
receive, from each respective content receiver of the first subset of content receivers, results of the scan for available over-the-air channels;
update the customized over-the-air channel mapping based on a comparison between the received scan results and the customized over-the-air channel mapping; and
provide the updated customized over-the-air channel mapping to each of the plurality of content receivers in the geographical area to update their stored local mapping of available over-the-air channels.

* * * * *